(12) United States Patent
Toncich et al.

(10) Patent No.: US 8,588,727 B2
(45) Date of Patent: Nov. 19, 2013

(54) ADAPTIVE LINEARITY COMMUNICATION DEVICE

(75) Inventors: Stanley S. Toncich, San Diego, CA (US); Samir S. Soliman, San Diego, CA (US); Amol Rajkotia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 12/406,910

(22) Filed: Mar. 18, 2009

(65) Prior Publication Data

US 2009/0239496 A1    Sep. 24, 2009

Related U.S. Application Data

(60) Provisional application No. 61/038,710, filed on Mar. 21, 2008.

(51) Int. Cl.
  *H04B 1/16*     (2006.01)
(52) U.S. Cl.
  USPC .................. 455/343.1; 455/232.1; 455/234.1; 455/234.2; 455/293
(58) Field of Classification Search
  USPC .............. 455/343.1, 232.1, 234.1, 234.2, 293
  See application file for complete search history.

(56) References Cited

U.S. PATENT DOCUMENTS

| 5,712,593 | A |  | 1/1998 | Buer et al. |
| 6,137,355 | A |  | 10/2000 | Sevic et al. |
| 6,298,221 | B1 |  | 10/2001 | Nguyen |
| 6,847,262 | B2 | * | 1/2005 | Ichitsubo et al. ............. 330/307 |
| 7,003,272 | B1 |  | 2/2006 | Mader et al. |
| 2003/0139207 | A1 |  | 7/2003 | Yamazaki |
| 2004/0192408 | A1 | * | 9/2004 | Sharp et al. .................... 455/572 |
| 2004/0207468 | A1 | * | 10/2004 | Klomsdorf et al. ........... 330/129 |
| 2006/0067028 | A1 |  | 3/2006 | Floyd |
| 2007/0021087 | A1 |  | 1/2007 | Turner |
| 2007/0021092 | A1 | * | 1/2007 | Park .......................... 455/343.1 |

FOREIGN PATENT DOCUMENTS

| CN | 1252905 A | 5/2000 |
| CN | 1900882 A | 1/2007 |
| EP | 1746734 A2 | 1/2007 |
| JP | 03026028 | 4/1991 |

(Continued)

OTHER PUBLICATIONS

International Search Report and the Written Opinion—PCT/US2009/037895, International Search Authority—European Patent Office—Jun. 10, 2009.
Taiwan Search Report—TW098109265—TIPO—Apr. 11, 2013.

*Primary Examiner* — Daniel D Chang
(74) *Attorney, Agent, or Firm* — Jeffrey D. Jacobs; Alan C. Gordon

(57) ABSTRACT

An adaptive linearity communication device and its operation are disclosed. The adaptive linearity communication device may include a component having a linearity dependent upon a bias and a processor configured to change the bias in response to the detection of a connection between the wireless communication device and a high-capacity power source. A method of operating an adaptive linearity communication device having a bias dependent component where the device is configured to operate in a high efficiency mode in the absence of a connection between the device and a high-capacity power source, may include determining whether a high-capacity power source is connected to the wireless communication device, and varying the operation of the bias dependent component based on whether a high-capacity power source is connected to the wireless communication device.

30 Claims, 5 Drawing Sheets

(56) References Cited

FOREIGN PATENT DOCUMENTS

| | | |
|---|---|---|
| JP | 11069451 A | 3/1999 |
| JP | 2001513271 A | 8/2001 |
| KR | 0310402 | 12/2001 |
| RU | 2005129847 A | 4/2007 |
| WO | WO9849771 A1 | 11/1998 |
| WO | WO 2009117717 A1 * | 9/2009 |

* cited by examiner

ADAPTIVE LINEARITY COMMUNICATION DEVICE

CLAIM OF PRIORITY UNDER 35 U.S.C. §119

The present Application for Patent claims priority to Provisional Application No. 61/038,710 entitled "Adaptive Linear Receiver" filed Mar. 21, 2008, and assigned to the assignee hereof and hereby expressly incorporated by reference herein.

BACKGROUND

1. Field

This invention is generally related to wireless communications, and more particularly, to systems and methods of constructing and operating an adaptive linearity communication device for a wireless communication system.

2. Background

Wireless communication devices may include receivers that process incoming signals to extract information or data from a transmitted signal. Conventional receivers include components that have a response dependent on bias. The bias may be a voltage bias and/or a current bias depending on the particular receiver component. Typically, the linearity of operation of the receiver component increases with the bias that is applied. As the bias is reduced from an optimum linearity level, the linearity of a receiver component decreases and the response becomes increasingly non-linear.

Intermodulation distortion (IMD) increases as the response becomes non-linear. IMD degrades performance of the receiver by introducing interference energy within the receive band. When a non-linear response is applied to two or more interfering signals, the signals may mix to produce IMD products (signals). Accordingly, interfering signals processed by the receiver component with a non-linear response may result in IMD signals within the receive band, although one or more of the original interfering signals are outside the receive band. Sensitivity and overall receiver performance is reduced as IMD signals increase. Unfortunately, increasing bias and operating components in a linear mode is inefficient. Slight increases in bias and linearity may result in large additional power consumption. In wireless communication devices where power is limited, increasing bias to the receiver components may significantly reduce the battery life ("talk time").

Various techniques have been employed to increase the linearity of receiver components while minimizing the adverse affect upon the battery life. However, the previous attempts remain inadequate to optimize the operation of receiver components while conserving battery life. Therefore, there is need for improvement.

SUMMARY

Disclosed herein is a new and improved adaptive linearity communication device and methods for use in a wireless communication system.

In accordance with an aspect, a wireless communication device having a component having a linearity dependent upon a bias, includes a processor configured to change the bias in response to the detection of a connection between the wireless communication device and a high-capacity power source.

In accordance with another aspect, a wireless communication device includes a component having a linearity dependent upon a bias, and a means for changing the bias in response to the detection of a connection between the wireless communication device and a high-capacity power source.

In accordance with another aspect, a method for operating a wireless communication device having a bias dependent component, and the device being configured to operate in a high efficiency mode in the absence of a connection between the device and a high-capacity power source, comprising determining whether a high-capacity power source is connected to the wireless communication device, and varying the operation of the bias dependent component based on whether a high-capacity power source is connected to the wireless communication device.

In accordance with a further aspect, a computer-readable medium embodying a set of instructions executable by one or more processors for operating a wireless communication device having a bias dependent component, and the device being configured to operate in a high efficiency mode in the absence of a connection between the device and a high-capacity power source, including code for determining whether a high-capacity power source is connected to the wireless communication device, and code for varying the operation of the bias dependent component based on whether a high-capacity power source is connected to the wireless communication device.

Other systems, methods, aspects, features, embodiments and advantages of the adaptive linearity communication device disclosed herein will be, or will become, apparent to one having ordinary skill in the art upon examination of the following drawings and detailed description. It is intended that all such additional systems, methods, aspects, features, embodiments and advantages be included within this description, and be within the scope of the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the apparatus and methods disclosed herein. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the appended claims.

Figure 1:
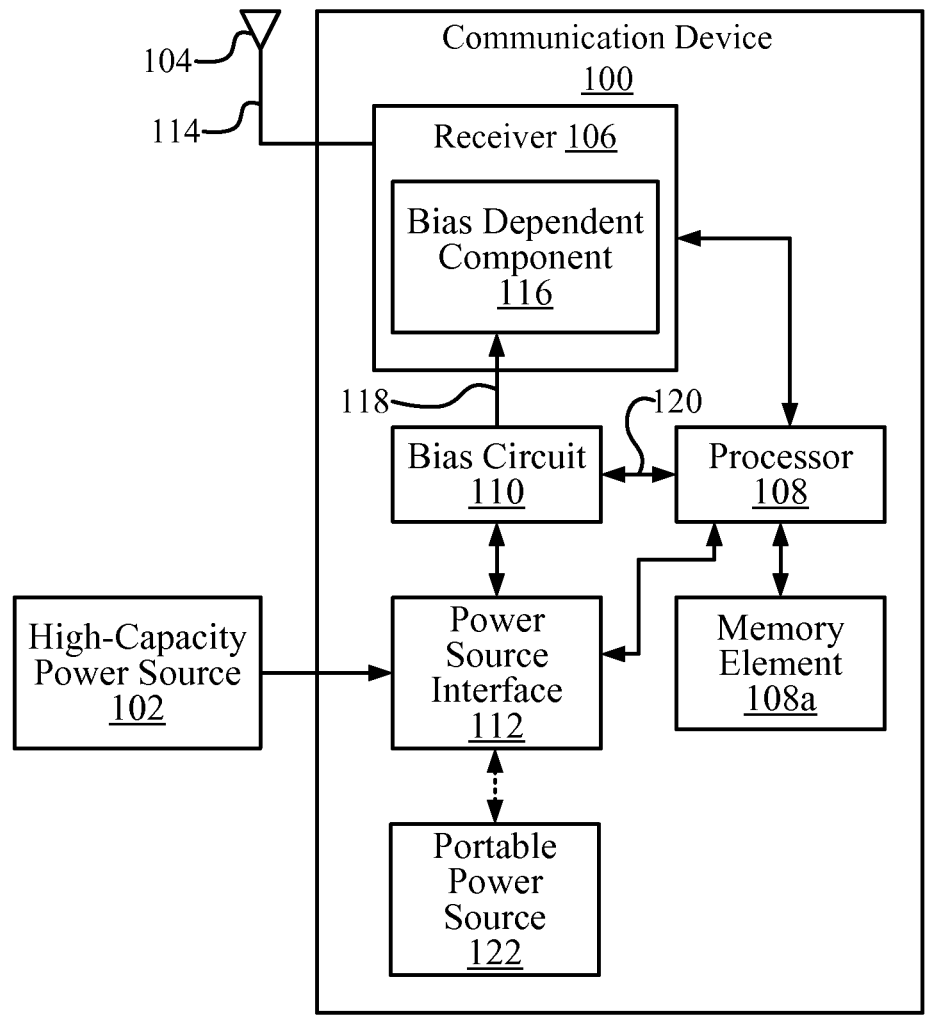
FIG. 1 is a block diagram of an exemplary wireless communication device, including an adaptive linearity receiver, and a high-capacity power source.

FIG. 1 is a block diagram of an exemplary wireless communication device 100 and a high-capacity power source 102. Communication device 100 may include an antenna 104, a receiver 106, a processor 108, a memory element 108a, a bias circuit 110, a power source interface 112, and a portable power source 122. The antenna 104 may receive incoming signals on the line 114. The incoming signal may include, for example, a carrier signal and various interfering signals, and may be based on various protocols including, but not limited to, ultra-wide band (UWB). The incoming signal may be provided to the receiver 106 for processing. The operation of the receiver 106 may generally be determined by the relationships and interconnections between receiver components, and upon the various control signals received by the receiver 106 from other components of the communication device 100, such as the processor 108, and/or upon the incoming signal on the line 114.

Among other internal components, the receiver 106 may include bias dependent components 116. The bias dependent components 116 may be numerous components whose linearity of operation may depend upon the bias provided to the bias dependent components 116, for example, but not limited to, mixers, filters, amplifiers, low noise amplifiers, analog to digital converters (ADCs), and/or combinations of such devices. In FIG. 1, the bias for the bias dependent components 116 may be provided on line 118.

The communication device 100 may be mobile or stationary, and may communicate with one or more base stations (not shown). Examples of the wireless communication device 100 include, but are not limited to, cellular telephones, personal digital assistances (PDAs), laptop computers, PC cards, compact flash devices, external modems and internal modems. In many communication systems, the communication device 100 transmits and receives data packets through one or more modem pool transceivers to an HDR base station controller (not shown). An access network (not shown) may transport data packets between multiple communication devices, such as the communication device 100. The access network may be further connected to additional networks (not shown) outside the access network, such as a corporate intranet or the Internet, and may transport data packets between each access terminal and such outside networks. Though shown for illustrative purposes having the antenna 104, the communication device 100, may be any data device that communicates through a wireless channel or through a wired channel, for example using fiber optic or coaxial cables.

The bias may be a current bias, a voltage bias, or a combination of the two, for different components within the receiver 106. As described in further detail below, the bias may be increased when certain conditions are met in order to increase the linearity of the bias dependent components 116 and to decrease intermodulation distortion (IMD).

The bias may be provided, controlled and managed through the bias circuit 110 responsive to a control signals generated by the processor 108 and provided to the bias circuit 110 on a line 120. The processor 108, using any required peripherals and/or input/output devices, may manage the bias provided by the bias circuit 110 and may detect the connection of the high-capacity power source 102 through the power source interface 112. Based upon various conditions described and illustrated herein, the processor 108 may communicate with the bias circuit 110 in order to operate the bias dependent components 116 in various manners, including a high efficiency mode and a high linearity mode. The control signal on the line 120 may include, but is not limited to, providing two or more bias points for setting the bias of the one or more bias dependent components 116.

Any of numerous criteria may be used to determine whether the bias should be increased or decreased to place one or more of the bias dependent components 116 in a high efficiency mode or a high linearity mode. In one example, the bias is increased, and one or more of the bias dependent components 116 are operated in high linearity mode, when the high-capacity power source 102 is connected. In another example, the bias is only increased if the high-capacity power source 102 is connected and interference on the line 114 is detected. Interference may be in a number of forms, including, but not limited to IMD signals and cross-modulation. For another example, the bias is increased if the high-capacity power source 102 is connected and the wireless communication system is operating in a jurisdiction that requires a high linearity mode of operation. Such jurisdictions may call for high linearity operation to avoid interference among wireless communication systems in close proximity.

The interference may be detected within a particular frequency band or as an overall energy level outside the reception band. Further, the interference may be detected by observing IMD. Where the criteria for increasing the bias includes detecting interference, the receiver 106 may include circuitry and/or software for evaluating the signals received through the antenna 104. Those having ordinary skill in the art are familiar with such circuitry and/or software for evaluating the signals received.

The power source interface 112 may include a connector for connecting to the high-capacity power source 102. In some circumstances, the power source interface 112 may also include circuitry, such as power conversion, power regulation and switching circuitry.

The high-capacity power source 102 connects to the power source interface 112. The high-capacity power source 102 may be any type of power source that is capable of providing power to communication device 100 at a level that does not diminish operational parameters, for example, but not limited to, power provided or derived from alternating current (AC) outlets, wireless power (such as RF to DC power conversion via near-field inductive coils) devices, inductive mats and vehicle electrical systems. The high-capacity power source 102 may be an AC/DC adapter plugged into a 110 volt AC outlet, or alternatively, the high-capacity power source 102 may be a direct connection to the AC 110 volt outlet. Further, the high-capacity power source 102 may be a 12 volt supply from a vehicle.

The processor 108 may be any combination of hardware, software and/or firmware that executes the functions described herein as well as performing overall management functions of the device. The processor 108 may also perform other functions associated with the operation of the wireless communication device 100 as is known to those having skill in the art. The memory element 108a may be connected to the processor 108 for storing software code and other data.

The portable power source 122 may provide temporary power to the communication device 100, for example, when the high-capacity power source 102 is not connected to the communication device 100. In some situations, the portable power source 122 may be charged by the high-capacity power source 102, and/or may provide power to the communication device 100 when the high-capacity power source 102 is disconnected. The portable power source 122 may be internal to the communication device 100 or may be an external component that is connected to the communication device 100. The portable power source 122 may be any power source or source that can be transported with the communication device 100, for example, but not limited to, a battery, solar cells, capacitors, and inductive mats. The power source interface 112 may include circuitry for managing the charging of the portable power source 122.

The high-capacity power source 102 may be distinguished from the portable power source 122 in that increasing the power consumption of the device 100 when connected to the high-capacity power source 102 does not limit any performance parameters of the communication device 100, whereas increasing the power consumption of the communication device 100 when connected only to the portable power source 122 may result in performance consequences. Examples of such performance consequences include a decrease in operational time ("talk time"), a decrease in transmission power, a decrease in illumination intensity, a decrease in display intensity, and a decrease in audio power level.

The bias circuit 110 and/or processor 108 may set, based on, for example, the connection status of the high-capacity power source 102, the bias to at least the bias dependent component 116. In the exemplary embodiment, the processor 108 generates a control signal on line 120 that sets the bias circuit 110 to provide a bias to one or more bias dependent components 116. The control signal on line 120 may directly relate to a bias level, and/or may provide a reference point to which the bias level is set. For example, where the bias circuit 110 includes a feedback loop that maintains the bias based on current consumption (or some other parameter), the control signal on line 120 may provide a reference level for the loop.

Figure 2:
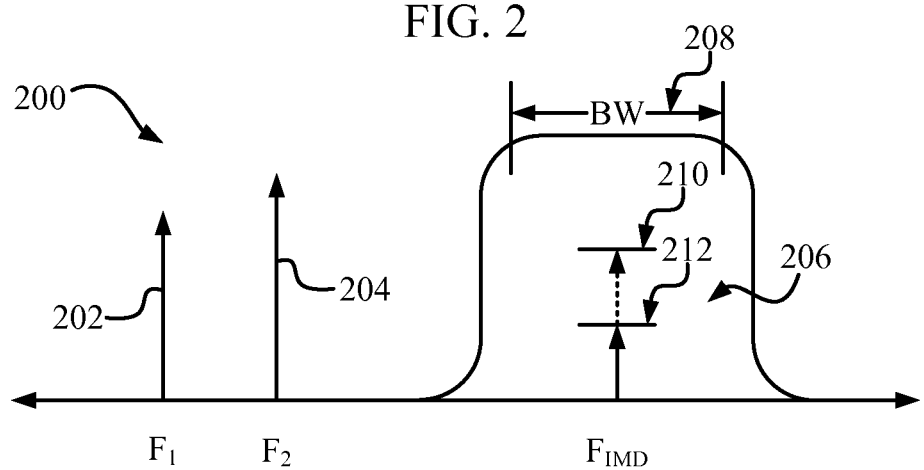
FIG. 2 is a graphical illustration of an exemplar frequency spectrum that may be received by the wireless communication device of FIG. 1.

FIG. 2 is a graphical illustration of an exemplar frequency spectrum 200 that may be received by the wireless communication device 100 of FIG. 1. The frequency spectrum 200 shows interference signals 202 and 204 and an intermodulation distortion (IMD) signal 206 within a receive band 208. The IMD signal 206 may be caused by at least the two interference signals 202 and 204.

Non-linearity in a receiver can cause signals outside of receive band, such as the receive band 208, to mix and form an IMD signal, such as the IMD signal 206, within the receive band. The IMD signal 206 may be a sum and/or difference of various harmonics of various interfering signals. For example, if one interfering signal has a frequency of $F_1$, such as signal 202, and another has a frequency of $F_2$, such as signal 204, potential first order IMD signal frequencies include $F_{IMD}=F_1+F_2$ and $F_{IMD}=F_1-F_2$. Potential second order IMD signal frequencies include $F_{IMD}=2F_1+F_2$, $F_{IMD}=2F_1-F_2$, $F_{IMD}=F_1+2F_2$ and $F_{IMD}=F_1-2F_2$. Other IMD orders may be present depending on the particular circumstances. The amplitude and energy level of an IMD signal, such as the IMD signal 206, may depend on the linearity of the receiver, such as the receiver 106, which may depend upon the linearity of receiver components, such as the bias dependent components 116.

For the case illustrated in FIG. 2, for a first bias, IMD signal 206 may have a first amplitude 210. When the bias is increased to a second bias, IMD signal 206 may have a lower amplitude 212. Accordingly, FIG. 2 provides a graphical example of IMD signal 206 during the high efficiency mode, where IMD signal 206 may have amplitude 210, and the high linearity mode, where a greater bias may be provided to one or more of the bias dependent components 116, and where the IMD signal 206 may have the lower amplitude 212.

Figure 3:
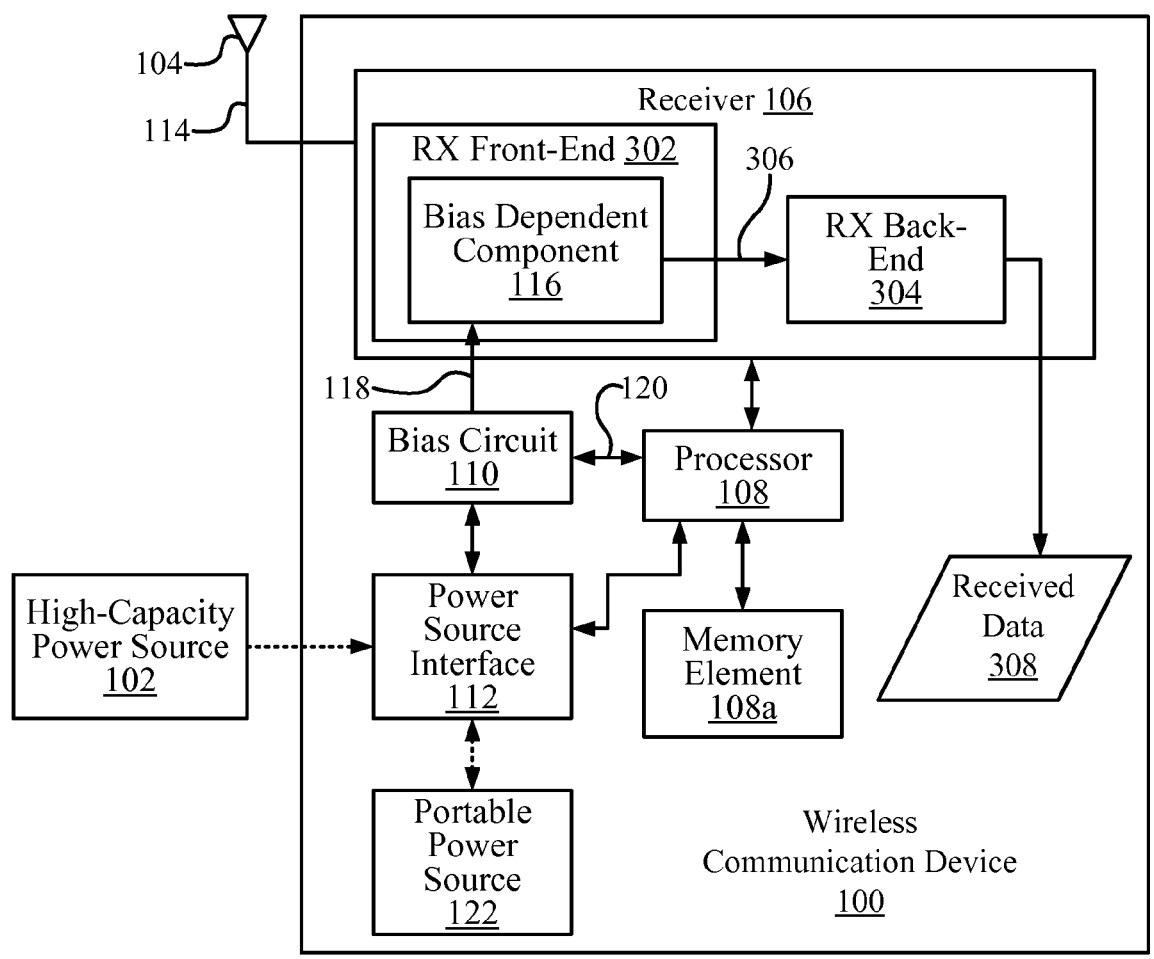
FIG. 3 is a more detailed block diagram of the wireless communication device of FIG. 1 illustrating that the wireless communication device may include a receiver front end having a component with a linearity that is dependent on bias.

FIG. 3 is a more detailed block diagram of the wireless communication device 100 of FIG. 1 illustrating that the receiver 106 may include a receiver front end 302 and a receiver back end 304. The receiver front end 302 generally includes bias dependent components 116 as illustrated in FIG. 1. However, it is within the scope of the invention that the bias dependent components 116 may be included in any portion of the communication device 100. The receiver front end 302 typically includes analog components such as mixers, filters, low noise amplifiers and analog to digital converters (ADCs). The bias dependent components 116 may include such analog components.

The receiver front end 302 may receive the incoming signal on line 114 and may convert the carrier signal to a baseband and/or an intermediate frequency signal, and then provide the baseband and/or intermediate signal to the receiver back end 304 on a line 306. The receiver back end 304 may further process the baseband and/or an intermediate frequency signal to recover a received data 308.

The receiver back end 304 typically includes digital signal processing components that are power efficient, where bias and power consumption are less of an issue than in the receiver front end 302. In some cases, at least some of the receiver back end functions may be implemented within a controller or a processor, microprocessor, application specific integrated circuit (ASIC), or other processor arrangement. In addition, some or all of the functions of the processor 108 may be implemented on or in the same chip or processor used to perform functions associated with the receiver back end 304.

Processor 108 may establish two bias points with the control signal on line 120. Processor 108 may cause communication device 100 to operate in a high efficiency mode wherein the receiver 106 experiences relatively low power consumption and a relatively low linear response of one or more bias dependent components 116 by controlling the bias signal on line 118 to meet, for example, a threshold or minimum performance requirement. Processor 108 may also cause communication device 100 to operate in a high linearity mode wherein the receiver 106 experiences relatively high power consumption and a relatively high linear response of one or more bias dependents components 116 by controlling the bias signal on line 118.

As an example, processor 108 may set the bias to the high linearity mode when processor 108 detects the connection of the high-capacity power source 102 to power source interface 112. Otherwise, the bias may be set to the high efficiency mode with lower linearity. As a second example, processor 108 may set the bias to the high linearity mode only when processor 108 detects the high-capacity power source 102 is connected to power source interface 112 and an interfering signal is detected on line 114. As non-limiting examples, the interfering signal may be detected using a spectral analysis and/or may be detected by determining that an IMD signal, for example IMD signal 206, is above a threshold.

Figure 4:
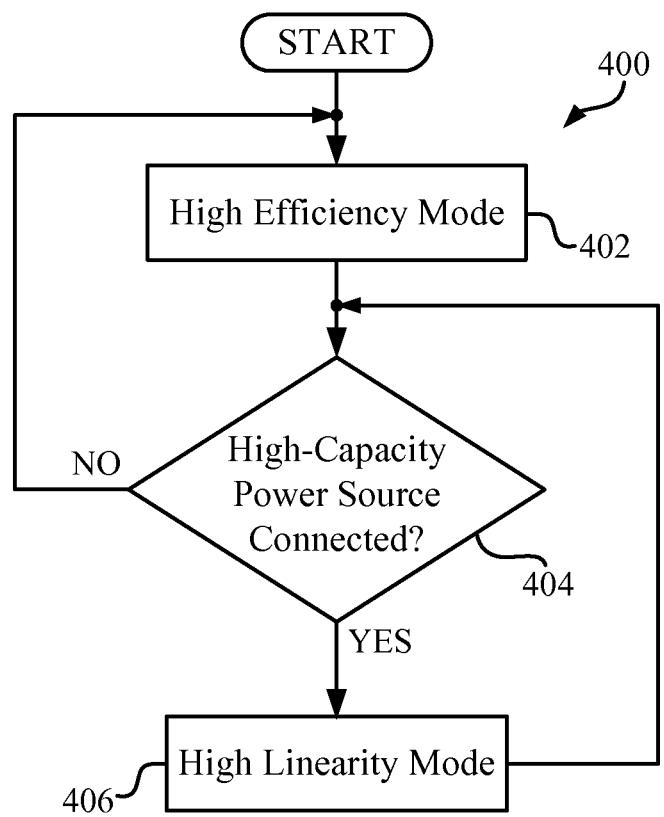
FIG. 4 is a flow chart of a method of adjusting the linearity of a wireless communication device, such as, but not limited to, the wireless communication device of FIG. 1 and FIG. 3.

FIG. 4 is a flow chart of an exemplary method 400 of adjusting the linearity of a wireless communication device, such as, but not limited to, the wireless communication device 100 of FIG. 1 and FIG. 3. Exemplary method 400, though not limited by any particular hardware, may be performed, at least partly, by executing code using processor 108. In addition, method 400 may be performed by any combination of hardware, software, and/or firmware.

In block 402 of method 400, a wireless communication device, for example wireless communication device 100, may be directed to operate in a high efficiency mode. One manner of operating in a high efficiency mode includes providing an instruction to a bias circuit, for example bias circuit 110, to provide a bias signal to operate at least one component, for example one or more bias dependent components 116, in a high efficiency mode.

In block 404 of method 400, it is determined whether a high-capacity power source, for example the high-capacity power source 102, has been connected to the wireless communication device. In an exemplary embodiment, detection circuitry may determine if power is provided to the power source interface 112 from the high-capacity power source 102, such as an AC adapter or a 12 volt vehicle adapter. The determination of whether the high-capacity power source has been connected may be made according to a variety of criteria, such as but not limited to, based upon a preprogrammed interval and/or based on a user selectable setting. If the high-capacity power source is connected, method 400 continues to block 406. Otherwise, method 400 recycles to block 402.

In block 406, a bias circuit, for example bias circuit 110, is directed to provide a bias signal to operate at least one component, for example one or more bias dependent components 116, in a high linearity mode. The high linearity mode may result in the receiver, for example, the receiver 106, operating with a more linear response than when the receiver may operate in the high efficiency mode. In most situations, the power consumed by the receiver will be greater when operating in the high linearity mode. In other embodiments, the high linearity mode may include variable linearity settings that may depend upon various factors, such as, but not limited to, the level of any interference affecting the receipt of the received data 308, and the level of charge of the portable power source 122. After block 406, method 400 may return to block 404.

In the event a high-capacity power source is disconnected, the method may then return to block 402 from block 404. The high efficiency mode of block 402 may result in the receiver, for example, the receiver 106, operating with a less linear response than when the receiver may operate in the high linearity mode.

Figure 5:
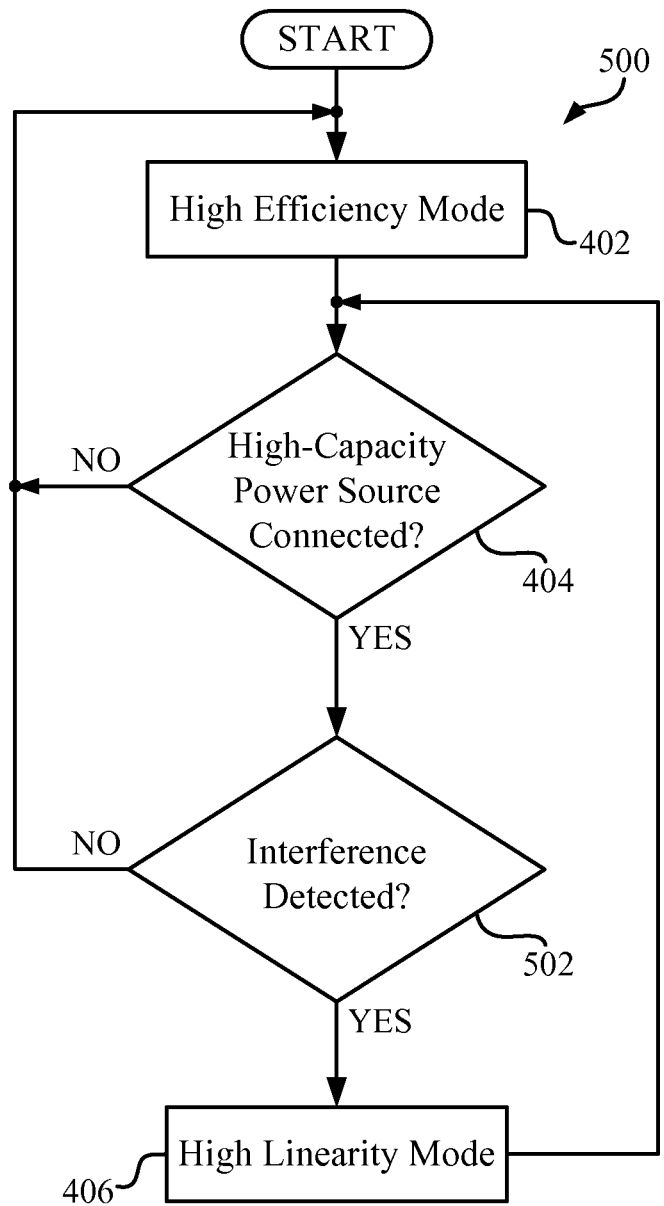
FIG. 5 is a second flow chart of a method of adjusting the linearity of a wireless communication device, such as, but not limited to, the wireless communication device of FIG. 1 and FIG. 3.

FIG. 5 is a flow chart of a second exemplary method 500 of adjusting the linearity of a wireless communication device, such as, but not limited to, the wireless communication device 100 of FIG. 1 and FIG. 3. As with method 400, exemplary method 500, though not limited by any particular hardware, may be performed, at least partly, by executing code using processor 108. In addition, method 500 may be performed by any combination of hardware, software, and/or firmware.

As illustrated in FIG. 5, method 500 includes several blocks that have been previously described in regard to method 400. However, in method 500, if a high-capacity power source is connected in block 404, method 500 continues to block 502 rather than directly to block 406. Otherwise, method 500 recycles from block 404 to block 402 as with method 400.

In block 502, it is determined whether interference has been detected, for example, interference may be detected on line 114 of the wireless communication device 100. In the exemplary embodiment, received signals are analyzed to determine if there are at least two interfering signals, for example interference signals 202 and 204, that may cause IMD, such as IMD signal 206, with a receive band. Other techniques for determining whether interference is present include evaluating the amplitude of the IMD signal, and determining interference is present if the amplitude is above a threshold. If the interference is detected, method 500 continues to block 406. Otherwise, method 500 returns to block 402.

Figure 6:
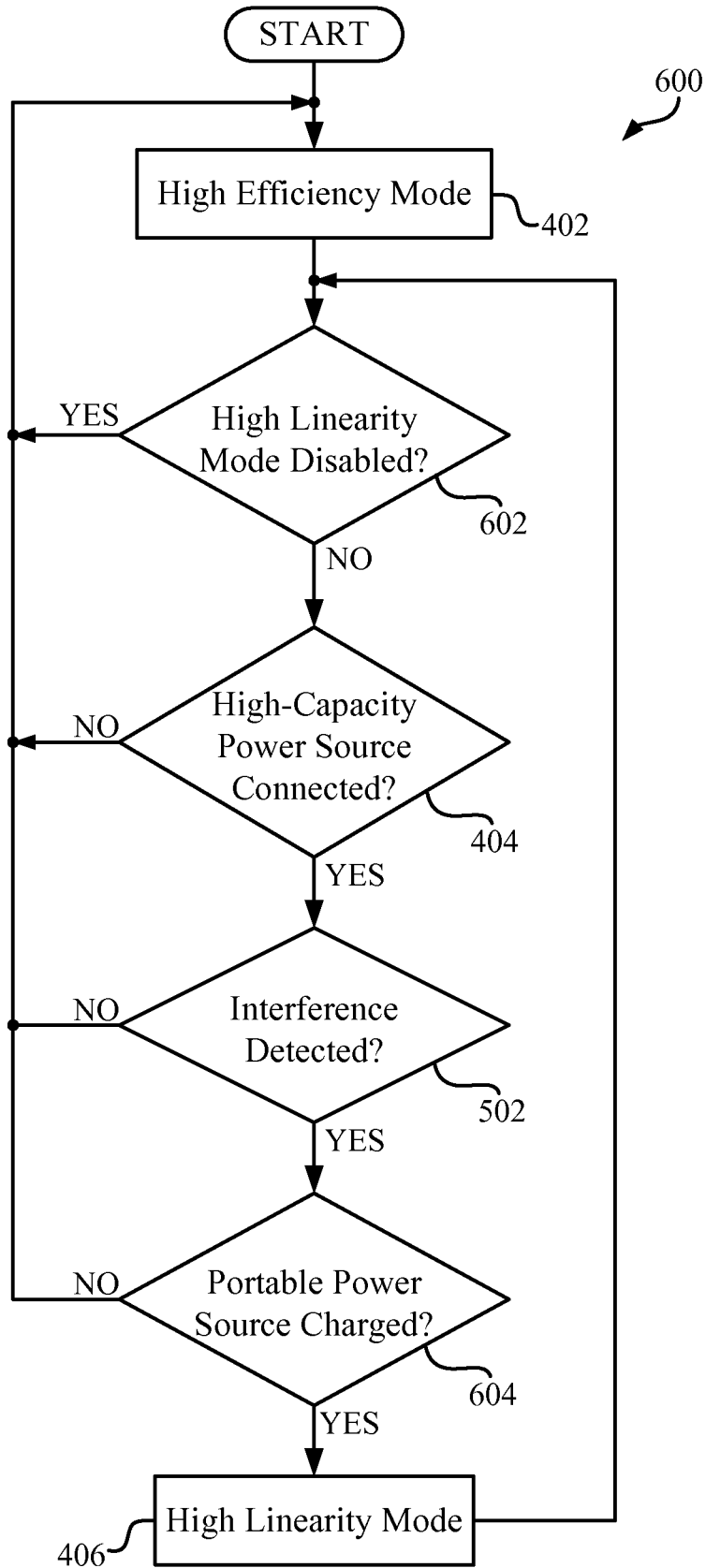
FIG. 6 is a third flow chart of a method of adjusting the linearity of a wireless communication device, such as, but not limited to, the wireless communication device of FIG. 1 and FIG. 3.

FIG. 6 is a flow chart of a further exemplary method 600 of adjusting the linearity of a wireless communication device, such as, but not limited to, the wireless communication device 100 of FIG. 1 and FIG. 3. As with methods 400 and 500, exemplary method 600, though not limited by any particular hardware, may be performed, at least partly, by executing code using processor 108. In addition, method 500 may be performed by any combination of hardware, software, and/or firmware.

As illustrated in FIG. 6, method 600 includes several blocks that have been previously described in regard to methods 400 and 500. However, method 600 includes additional block 602 and 604.

In block 602, it is determined whether the high linearity mode of operation has been disabled. The high linearity mode may be disabled for a variety of reason and in a number of manners, such as but not limited to, through a user option, through a factory setting, through an equipment manufacturer setting, and/or based on geography or jurisdictional requirements or lack thereof. In the event the high linearity mode is disabled, the method 600 may return to block 402 and the wireless communication device may continue to operate in a high efficiency mode. In the event the high linearity mode is not disabled, method 600 may continue to block 404.

Method 600 may operate in the manner previously described in regard to blocks 404 and 502. In the event interference is detected in block 502, method 600 may continue to block 604. In block 604, it is determined whether the level of the charge of a portable power source, for example portable power source 122, exceeds a threshold indicating sufficient charge to allow the wireless communication device 100 to operate in a high linearity mode, without overly compromising the ability of the high-capacity power source, for example the high-capacity power source 102, to charge the portable power source, or to perform other power intensive activities. In some situations, the threshold may be set low since the high-capacity power source 102 may be capable of charging the portable power source 122 while also providing sufficient power to operate the receiver 106 without adverse consequences. If the charge of the portable power source does not exceed the threshold, method 600 may recycle to block 402. If the charge of the portable power source does exceed the threshold, method 600 continues to block 406.

The functionality, operations and architecture depicted by the blocks of methods 400, 500 and 600 may be implemented using modules, segments, and/or portions of software and/or firmware code. The modules, segments, and/or portions of code include one or more executable instructions for implementing the specified logical function(s). In some implementations, the functions noted in the blocks may occur in a different order than that shown in FIG. 4, FIG. 5 and FIG. 6. For example, two blocks shown in succession in FIG. 4, FIG. 5 and/or FIG. 6 may be executed concurrently, or the blocks may sometimes be executed in another order, depending upon the functionality involved.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

As mentioned above, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The above description of the disclosed embodiments is provided to enable any person skilled in the art to make or use that which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings.

What is claimed is:

1. A wireless communication device, comprising:
a component having a linearity dependent upon a bias; and
a processor configured to change the bias in response to detection of a connection between the wireless communication device and a high-capacity power source.

2. The wireless communication device of claim 1, wherein the component is selected from a group consisting of a mixer, a filter, an amplifier, an analog-to-digital converter (ADC), and any suitable combination of the foregoing components.

3. The wireless communication device of claim 1, wherein the bias is a current bias.

4. The wireless communication device of claim 1, wherein the bias is a voltage bias.

5. The wireless communication device of claim 1, wherein the processor is further configured to change the bias in response to the detection of the connection and detection of an interfering signal.

6. The wireless communication device of claim 1, wherein the processor is further configured to change the bias in response to the detection of the connection and detection of an interfering signal associated with the receipt of a UWB incoming signal.

7. The wireless communication device of claim 1, wherein the processor is further configured to change the bias in response to the detection of the connection and detection of an interfering signal associated with cross-modulation.

8. The wireless communication device of claim 1, wherein the processor is further configured to change the bias in response to the detection of the connection, and detection of an interfering signal associated with cross-modulation, and based upon the jurisdiction within which the device is operating.

9. The wireless communication device of claim 1, wherein the device is configured to process incoming signals based on a plurality of signal protocols, wherein the change of bias varies depending upon the protocol of the incoming signal.

10. The wireless communication device of claim 1, wherein the component is a receiver component.

11. The wireless communication device of claim 1, wherein the component is a receiver front end component.

12. The wireless communication device of claim 1, further comprising means for disabling the ability of the processor to change the bias in response to the detection of a connection between the wireless communication device and the high-capacity power source.

13. The wireless communication device of claim 1, wherein the processor changes the bias only when the charge of a portable power source exceeds a threshold.

14. The wireless communication device of claim 1, wherein the processor determines whether the connection exists at a preprogrammed interval.

15. The wireless communication device of claim 1, wherein the processor determines whether the connection exists at a user selectable interval.

16. A wireless communication device, comprising:
a component having a linearity dependent upon a bias; and
means for changing the bias in response to the detection of a connection between the wireless communication device and a high-capacity power source.

17. A method for operating a wireless communication device having a bias dependent component, comprising:
determining whether a high-capacity power source is connected to the wireless communication device; and
varying bias to the bias dependent component based on whether a high-capacity power source is connected to the wireless communication device.

18. The method of claim 17, wherein the bias dependent component is operated in a high linearity mode when a high-capacity power source is connected.

19. The method of claim 17, wherein the component is selected from a group consisting of a mixer, a filter, an amplifier, an analog to digital converter (ADC) and any suitable combination of the foregoing components.

20. The method of claim 17, wherein the bias is a current bias.

21. The method of claim 17, wherein the bias is a voltage bias.

22. The method of claim 17, further comprising determining whether an incoming signal includes an interfering signal, and changing the bias in response to the detection of the connection and the detection of the interfering signal.

23. The method of claim 17, further comprising determining whether an UWB incoming signal includes an interfering signal, and changing the bias in response to the detection of the connection and the detection of the interfering signal.

24. The method of claim 17, further comprising determining whether an incoming signal includes an interfering signal caused by cross-modulation, and changing the bias in response to the detection of the connection and the detection of the interfering signal.

25. The method of claim 17, wherein the device is configured to process incoming signals based on a plurality of signal protocols, wherein the bias varies depending upon the protocol of the incoming signal.

26. The method of claim 17, wherein the component is a receiver component.

27. The method of claim 17, wherein the component is a receiver front end component.

28. The method of claim 17, further comprising:
operating the device in a high-efficiency mode in the absence of a connection between the device and a high-capacity power source.

29. A non-transitory computer-readable medium embodying a set of instructions executable by one or more processors, comprising:
code for determining whether a high-capacity power source is connected to a wireless communication device; and
code for varying bias to a bias dependent component based on whether a high-capacity power source is connected to the wireless communication device.

30. The non-transitory computer-readable medium of claim 29, further comprising:
code for operating in a high efficiency mode in the absence of a connection between the device and a high-capacity power source.

\* \* \* \* \*